(No Model.)
P. HERZOG.
VAULT LIGHT.
No. 365,305. Patented June 21, 1887.
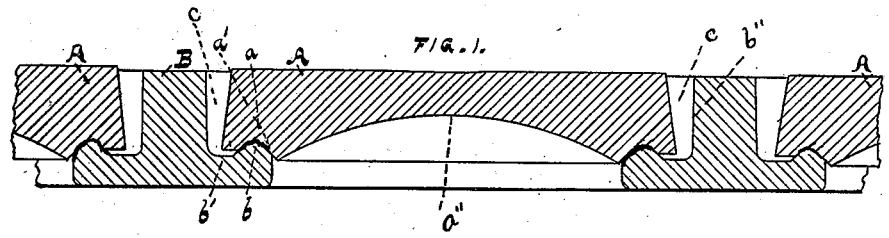
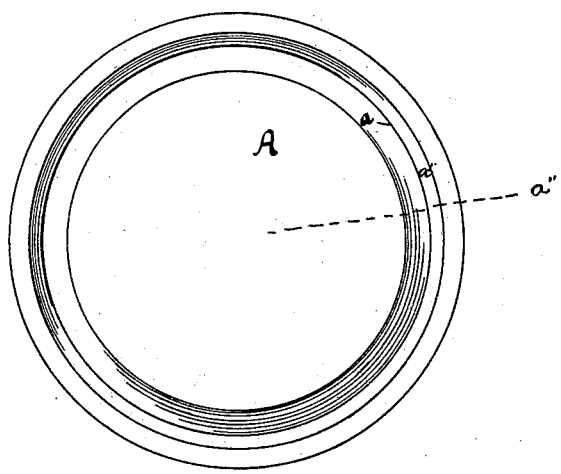
WITNESSES
INVENTOR

UNITED STATES PATENT OFFICE.

PHILIP HERZOG, OF MINNEAPOLIS, MINNESOTA.

VAULT-LIGHT.

SPECIFICATION forming part of Letters Patent No. 365,305, dated June 21, 1887.

Application filed July 23, 1886. Serial No. 208,835. (No model.)

*To all whom it may concern:*

Be it known that I, PHILIP HERZOG, a citizen of the United States, residing at the city of Minneapolis, in the county of Hennepin and State of Minnesota, have invented a new and useful Improvement in Skylights, Floor Lights, and Vault or Sidewalk Lights; and I hereby declare the following to be a full, clear, and exact description, which will enable others skilled in the art to which it appertains to make and use the same.

The object of my invention is to construct vault or sidewalk lights in such a manner that it will be impossible for water or moisture to pass through the joints or cement between the glasses and frame and to prevent leaking, and to provide by means of my new and improved glass a greater amount of light in the vault or other space beneath the lights than is possible with any of the lights now in use. I attain these objects by the mechanism illustrated in the accompanying drawings, in which—

Figure 1 is a vertical section of my improved vault or sidewalk light, showing glass-frame and manner of construction and joining. Fig. 2 is a view of the bottom of one of the glasses, showing annular recess and shoulder and concave bottom.

Similar letters refer to similar parts throughout the several views.

The iron frame B, with the annular recess $b'$, the annular shoulder $b$, and the side $b''$ in the annular openings, constitute the frame and receptacle for the glasses.

The glass A, with the annular shoulder $a'$, the annular recess $a$, and the concave surface $a''$, constitute the glasses for my improved vault-light. In the ordinary forms of vault-lights the holes in the frames in which the glasses are placed have vertical or slanting sides. The glasses are fastened in place by cement between frame and glass. The expansion and contraction of the metal and the action of water and moisture after a time allow water to pass through the joints into the space beneath the lights. In ordinary forms of vault-lights the glasses are small and convex on both surfaces, thus decreasing the light in the vault beneath.

In my improved vault-light the manner of construction is as follows: The receptacles in the frame for the glass are made with a nearly straight side, $b''$, an annular, square, hexagonal, or other shape recess or seat, $b'$, and an annular, square, hexagonal, or other shape shoulder, $b$. The glass is made of such a diameter or other shape that when placed in the frame there will be a space, $e$, between glass and frame of about one-eighth of an inch. The upper surface of the glass A is flat, and when in place will be level with the surface of the frame B. The under surface of the glass $a''$ is concave. On the under side of the glass is an annular or other shape shoulder, $a'$, made to fit tightly to the side of iron shoulder $b$ in the frame. An annular or other shaped recess, $a$, is made to fit loosely over the shoulder $b$ when the glasses are to be placed in the frame. The recess $a$ is filled with any water-tight cement. The glass is then pressed into position, the cement being forced into and completely filling the recess $b'$ and all points of contact between the frame and the under side of the glass. After the glass is thus placed in position the space $e$ between the glass and frame is filled with lead, cement, or other preparation, securely fastening the glass in the frame and sealing all joints. It will be seen by this manner of constructing vault-lights with shoulders and recesses in frame and glass substantially corresponding to each other, and the use of water-tight cement in the same, and securely sealing the joints, that it is impossible for water to pass through into the area beneath the lights, making an absolutely tight and water-proof vault or sidewalk light, being the only one known.

The concave surface gives great strength, and much larger glasses can be used than are ordinarily employed. The concave surface of the glass throws the light into the space beneath in such a way that a greater amount of light is obtained than is possible with any other form of vault-light as prepared for sidewalk or vault purposes.

Having fully described my invention, what I desire to claim and secure by Letters Patent is—

In a vault or other light, the frame B, a portion of the base of which is straight and a portion convex to form a projection, in combination with the glass provided with a groove for the reception of the projection upon the frame, the outer sides of which glass are of a less height than the edge of the concave portion for the purpose of leaving a greater cementing area, substantially as shown and described.

PHILIP HERZOG.

Witnesses:
C. B. ELLIOTT,
L. S. GILLETTE.